(12) United States Patent
Vandament et al.

(10) Patent No.: US 7,025,549 B1
(45) Date of Patent: Apr. 11, 2006

(54) MOTORCYCLE TIE DOWN SYSTEM

(76) Inventors: Marc Eric Vandament, 1105 Apollo Dr., Austin, TX (US) 78758; Susan Alene Vandament, 1105 Apollo Dr., Austin, TX (US) 78758

(*) Notice: Subject to any disclaimer, the term of this patent is extended or adjusted under 35 U.S.C. 154(b) by 0 days.

(21) Appl. No.: 10/808,714

(22) Filed: Mar. 23, 2004

(51) Int. Cl.
*B61D 45/00* (2006.01)
(52) U.S. Cl. .................................................... 410/100
(58) Field of Classification Search .............. 410/2, 410/3, 97, 100, 101, 103; 24/265 CD, 115 K; 248/499
See application file for complete search history.

(56) References Cited

U.S. PATENT DOCUMENTS

| | | | | |
|---|---|---|---|---|
| 5,326,202 A | * | 7/1994 | Stubbs | 410/3 |
| 5,529,448 A | * | 6/1996 | Kosma | 410/97 |
| 6,655,885 B1 | * | 12/2003 | Trauthwein | 410/97 |
| 6,705,811 B1 | * | 3/2004 | Selby | 410/3 |

* cited by examiner

*Primary Examiner*—H. Gutman
(74) *Attorney, Agent, or Firm*—Larry Mason Lee

(57) ABSTRACT

A lightweight, easily installed motorcycle securing device useful in transport of a motorcycle on a flat platform or trailer which provides for cuffs over the handlebars, tie down straps connected to the cuffs, and an adjustable tension connector strap between the cuffs. Construction from non-abrasive materials and provision for utilization of connection strap padding ensure that no marring of the paint or finish of the motorcycle being transported or damage to the handlebar grips or handlebar grip controls will occur.

1 Claim, 7 Drawing Sheets

MOTORCYCLE TIE DOWN SYSTEM

BACKGROUND OF THE INVENTION

The present invention is related generally to the field of devices and apparatus useful for securing a motorcycle or other two-wheeled vehicle to a trailer for transport. More specifically, the present invention is related to devices and apparatus which connect to the handlebars or steering mechanism of a two-wheeled vehicle to secure such vehicle from movement during transport of the vehicle.

There is a need to transport two-wheeled vehicles such as motorcycles, mopeds, scooters and bicycles. Using "motorcycle" as a synonym for "two-wheeled vehicle" throughout this application, motorcycles are transported daily from manufacturers to distributors and then on to dealers. The dealers' customers, in turn, then need means of transporting the motorcycle to their place of storage, to places of use, and to places of repair. Usually, such transport by a customer or an enthusiast is accomplished by placing the motorcycle in a trailer. "Trailer" is used throughout this application as a synonym for a horizontal flat surface, whether the back of a pickup vehicle, the bottom of a transportation crate, or a trailer.

Numerous systems of securing a two-wheeled vehicle to a trailer for transport are taught by the prior art. In particular, there are known to be strapping systems for maintaining a motorcycle in an upright position during transport. Yet more particularly, there are known to be strapping systems for maintaining a motorcycle in an upright position during transport which provide for straps to be connected between the handlebars or steering mechanism and the trailer for transport of the motorcycle.

Transporting motorcycles presents several problems. Often, motorcycles become damaged in transport between or by each member of the distribution and use chain, manufacturers, distributors, dealers, and customers or enthusiasts. Common areas of damage are to the handlebar grips, the levers, the control switches, and the motorcycle paint or finish. This incidental damage caused by transport must be repaired and thus adds incremental costs to the purchase and upkeep costs of the motorcycle.

There are several problems with the prior art systems of securing a two-wheeled vehicle to a trailer for transport and with the devices and apparatus disclosed in such prior art.

Some of the known systems are complex and expensive to manufacture, both the complexity which makes the system non-intuitive to use and the cost are problems.

Additionally, some of the known systems are made of metal chain and have cut resistant shackles. Such metallic construction discourages theft, but requires a different size securing unit to be manufactured for each size and/or style of motorcycle and creates a high probability of the metal of the securing system coming into contact with the paint or finish of the motorcycle being transported. Further, the metallic construction lends itself toward bulky, heavy securing units which are difficult for a single person to lift and install.

Yet further, some of the known systems secure tightly to the handlebar grips and assert forces upon the handlebar grips when in use, potentially causing damage to both the handlebar grips and the handlebar control switches which are mounted in close proximity to the handlebar grips.

Finally, some of the known systems utilize permanent brackets to secure the motorcycle to the transporting trailer. The usefulness of such systems is limited as the positioning of the brackets is optimal for at most a very few motorcycles of like size and configuration.

SUMMARY OF THE INVENTION

In brief summary, the present invention is of an apparatus useful for securing a motorcycle or other two-wheeled vehicle to a trailer for transport. More specifically, the present invention is of an apparatus which connects to the handlebars or steering mechanism of a two-wheeled vehicle to secure such vehicle from movement during transport of the vehicle. The preferred embodiment of the instant invention acts to secure a two-wheeled vehicle in an upright position to a trailer during transport.

Several problems have been noted in prior art systems to secure a two-wheeled vehicle to a trailer for transport and the instant invention was developed to overcome each of such known problems. Accordingly, it is a general object of the instant invention to provide an apparatus useful in a system to secure a motorcycle or other two-wheeled vehicle to a trailer for transport which is universally applicable to securing systems for all two-wheeled vehicles, is easily shifted from use with one motorcycle to use with another, and is easy to engage and disengage, whereby the securing system is quickly attached and unattached to the motorcycle.

Another object of this invention is to provide an inexpensive apparatus useful in a system to secure a motorcycle or other two-wheeled vehicle to a trailer for transport which is simple and intuitive to use.

Yet another object of the instant invention is to provide an apparatus useful in a system to secure a motorcycle or other two-wheeled vehicle to a trailer for transport which does not utilize permanent brackets to secure the motorcycle to the transporting trailer, thereby avoiding limitations of usefulness to only two-wheeled vehicles of like size and configuration.

Yet another and further object of the instant invention is to provide an apparatus useful in a system to secure a motorcycle or other two-wheeled vehicle to a trailer for transport which applies securing force in a direction opposite to the central axis of the motorcycle forks, whereby no torsion or twisting motions are induced and less movement of the motorcycle occurs during transport.

A yet further object of the instant invention is to provide an apparatus useful in a system to secure a motorcycle or other two-wheeled vehicle to a trailer for transport which attaches loosely to the handlebar grips of the vehicle being transported, thereby avoiding damage to both the handlebar grips and the handlebar control switches which are mounted in close proximity to the handlebar grips, and thereby accommodates interchange of the instant invention between a wide variety of motorcycle configurations.

A yet further and final object of this invention is to provide an apparatus useful in a system to secure a motorcycle or other two-wheeled vehicle to a trailer for transport which is lightweight and not constructed of metal thereby increasing the ease of installation and decreasing the probability of the apparatus' marring the paint or finish of the vehicle being secured.

Other objects and advantages of the present invention will be apparent upon reading the following description and appended claims.

DESCRIPTION OF THE NUMERIC REFERENCES

| No. | Description |
|---|---|
| 10 | motorcycle tie down apparatus |
| 20 | first handlebar grip cuff |
| 21 | first connector for first handlebar grip cuff |
| 22 | second connector for first handlebar grip cuff |
| 23 | loop in reinforcing strap for first handlebar grip cuff |
| 24 | third connector for first handlebar grip cuff |
| 25 | fourth connector for first handlebar grip cuff |
| 26 | reinforcing strap for first handlebar grip cuff |
| 29 | first handlebar grip cuff connection ring |
| 30 | second handlebar grip cuff |
| 31 | first connector for second handlebar grip cuff |
| 32 | second connector for second handlebar grip cuff |
| 33 | loop in reinforcing strap for second handlebar grip cuff |
| 34 | third connector for second handlebar grip cuff |
| 35 | fourth connector for second handlebar grip cuff |
| 36 | reinforcing strap for second handlebar grip cuff |
| 39 | second handlebar grip cuff connection ring |
| 41 | length adjustment mechanism for the handlebar grip cuff connection strap |
| 42 | connection strap tail |
| 43 | handlebar grip cuff connection strap |
| 44 | length adjustment mechanism connection strap |
| 45 | first connection strap connector |
| 46 | second connection strap connector |
| 47 | first length adjustment mechanism connection strap connector |
| 48 | second length adjustment mechanism connection strap connector |
| 50 | strap anti-scratch padding |
| 60 | interior of first grip cuff |
| 70 | interior of second grip cuff |
| 80 | first tie down strap |
| 81 | first tie down strap buckle |
| 82 | connector strap for first tie down strap buckle |
| 83 | securing hook for first tie down strap buckle |
| 84 | first tie down strap buckle connector |
| 85 | connecting hook for first tie down strap |
| 90 | second tie down strap |
| 91 | second tie down strap buckle |
| 92 | connector strap for second tie down strap buckle |
| 93 | securing hook for second tie down strap buckle |
| 94 | second tie down strap buckle connector |
| 95 | connecting hook for second tie down strap |
| 100 | first motorcycle handgrip |
| 110 | second motorcycle handgrip |
| 115 | motorcycle body |
| 120 | upper triple clamp or motorcycle fork end plate |
| 121 | first motorcycle handlebar |
| 122 | second motorcycle handlebar |
| 123 | motorcycle clutch lever |
| 124 | motorcycle brake lever |

DESCRIPTION OF THE DRAWINGS

While the novel features of the instant invention are set forth with particularity in the appended claims, a full and complete understanding of the invention can be had by referring to the detailed description of the preferred embodiment(s) which is set forth subsequently, and which is as illustrated in the accompanying drawings, in which:

DESCRIPTION OF THE PREFERRED EMBODIMENT(S)

Figure 1:
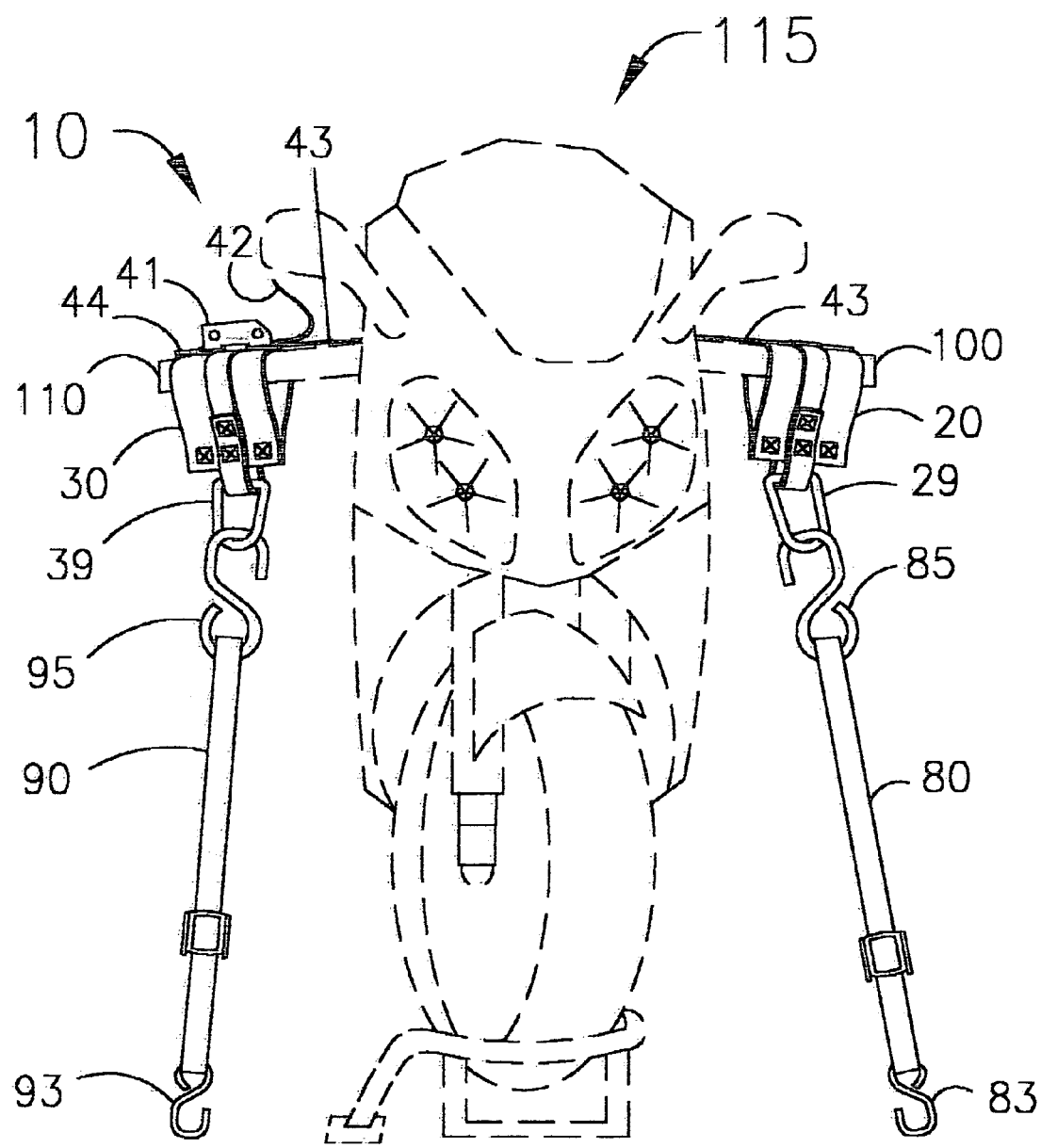
FIG. 1 is a vertical plane view of the instant invention installed on a motorcycle.

The instant invention, as depicted in FIG. 1, is of an apparatus 10 useful for securing a motorcycle 115 or other two-wheeled vehicle to a trailer for transport. As seen in FIG. 1, the apparatus 10 of the instant invention connects to the motorcycle handgrips, 100 and 110, or steering mechanism of motorcycle 115 or other two-wheeled vehicle to secure such vehicle in an upright position to restrain movement during transport of the vehicle.

FIG. 1 depicts the first handlebar grip cuff 20 in position on the first motorcycle handgrip 100, the second handlebar grip cuff 30 in position on the second motorcycle handgrip 110, the first handlebar grip cuff 20 and the second handlebar grip cuff 30 connected by the handlebar grip cuff connection strap 43, a first handlebar grip cuff connection ring 29 connected to both the first handlebar grip cuff 20 and the connecting hook 85 for first tie down strap, and a second handlebar grip cuff connection ring 39 connected to both the second handlebar grip cuff 30 and the connecting hook 95 for second tie down strap. The first tie down strap 80 and the second tie down strap 90 are, preferentially, standard cargo tie down straps. FIG. 1 does not depict the connection of the securing hooks, 83 and 93, for the first and second tie down straps, 80 and 90 respectively, to a fitting or other securing point whereas in practice such connection is required. The first embodiment, depicted in FIG. 1, depicts the connecting hook 85 for the first tie down strap connecting the first tie down strap 80 to the first handlebar grip cuff connection ring 29 and depicts the connecting hook 95 for the second tie down strap connecting the second tie down strap 90 to the second handlebar grip cuff connection ring 39. The handlebar grip cuff connection strap 43, as depicted in the drawings, connects at its first end to the first handlebar grip cuff 20 and at its second end to the length adjustment mechanism 41 for the handlebar grip cuff connection strap 43. The length adjustment mechanism 41 is depicted in the drawings as a common buckle which is connected to the second handlebar grip cuff 30 by a length adjustment mechanism connection strap 44. The depiction of the length adjustment mechanism 41 is in conjunction with depiction of the handlebar grip cuff connection strap 43, which depiction includes the feed through of the handlebar grip cuff connection strap 43 creating a connection strap tail 42.

Figure 2:
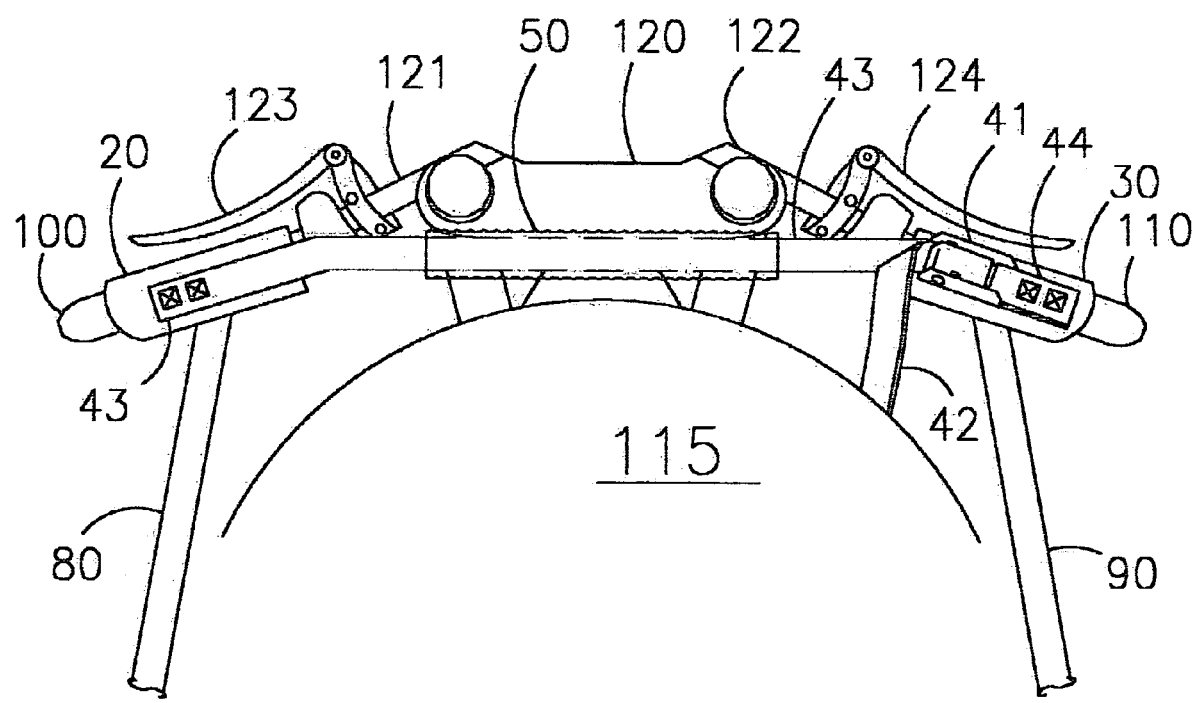
FIG. 2 is a horizontal plane view partially in perspective of the instant invention installed on a motorcycle.

FIG. 2 presents a top view of the apparatus 10 installed for use on a motorcycle 115. In FIG. 2 it can be seen that the first handlebar grip cuff 20 and the second handlebar grip cuff 30 are installed over the first motorcycle handgrip 100 and the second motorcycle handgrip 110, respectively, and beneath the motorcycle clutch lever 123 and the motorcycle brake lever 124, respectively. Also, depicted in FIG. 2 is the connection of the handlebar grip cuff connection strap 43 to the first handlebar grip cuff 20 at one end and to the length adjustment mechanism 41 at the other end. The length adjustment mechanism 41 is, itself, connected by the length adjustment mechanism connection strap 44 to the second handlebar grip cuff 30 and provides for the adjustment of the length of handlebar grip cuff connection strap 43 which is depicted in FIG. 2 as having a connection strap tail 42, being that portion of the handlebar grip cuff connection strap 43 which has been fed through the length adjustment mechanism 41. FIG. 2 further depicts the placement and use of the strap anti-scratch padding 50 which protects the motorcycle's 115 paint or finish from marring by abrasive contact with the handlebar grip cuff connection strap 43. In FIG. 2 the strap anti-scratch padding 50 is depicted as being interposed between the handlebar grip cuff connection strap 43 and the upper triple clamp 120 of the motorcycle body 115.

Figure 3:
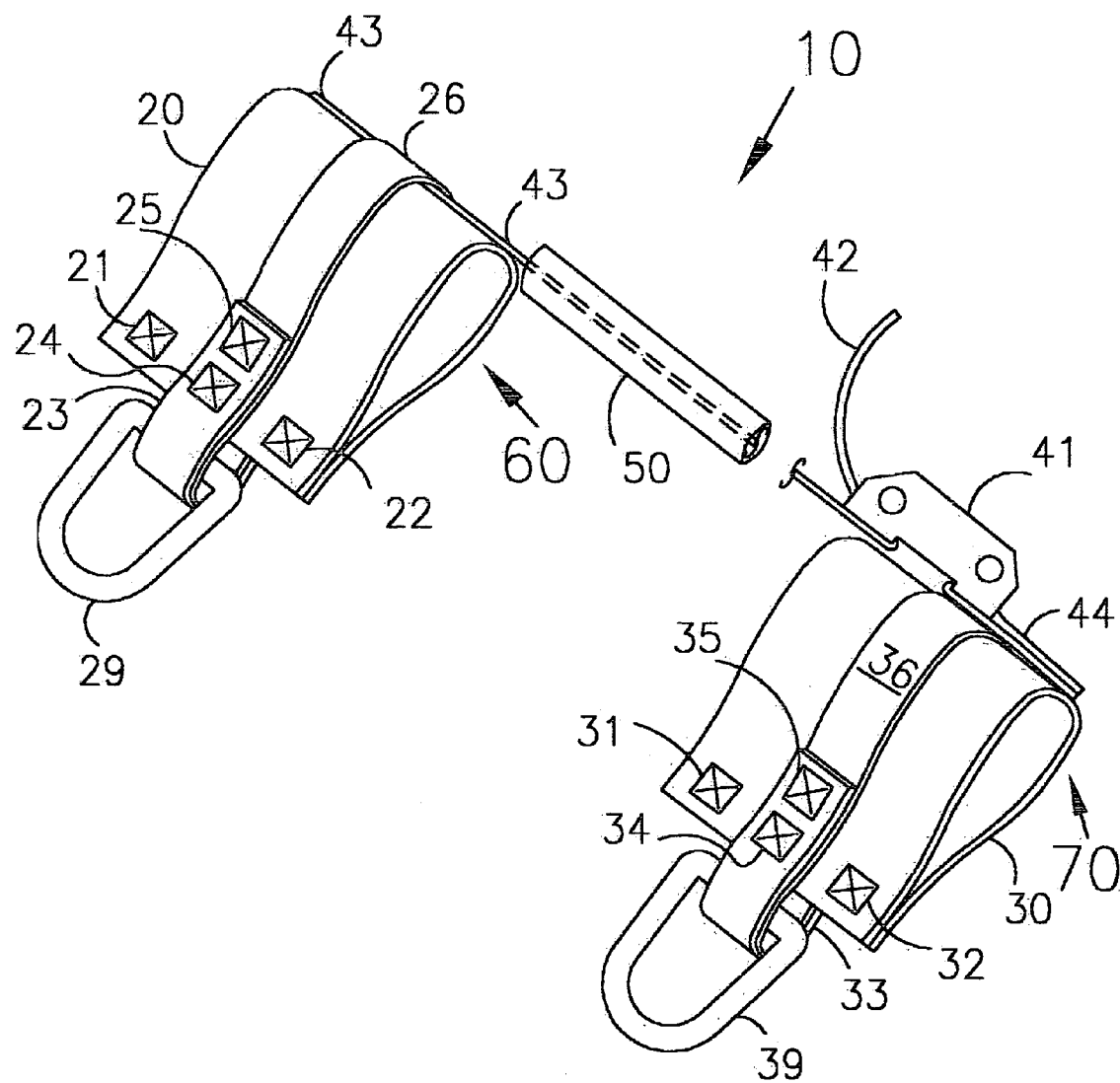
FIG. 3 is a lateral perspective view of the invention.

FIG. 3 provides a lateral perspective view of the instant invention 10, making clear the placement and connection of the reinforcing strap 26 for first handlebar grip cuff over the first handlebar grip cuff 20 and of the reinforcing strap 36 for second handlebar grip cuff over the second handlebar grip cuff 30. The first handlebar grip cuff 20 is formed by connecting together two ends of a pliable material such as canvas or leather, such connection depicted in FIG. 3 by the first connector 21 for first handlebar grip cuff and the second connector 22 for first handlebar grip cuff. Likewise, the second handlebar grip cuff 30 is formed by connecting together two ends of a pliable material such as canvas or leather, such connection depicted in FIG. 2 by the first connector 31 for second handlebar grip cuff and the second connector 32 for second handlebar grip cuff. Further depicted in FIG. 3, is the loop 23 in reinforcing strap for first handlebar grip cuff which connects the first handlebar grip cuff connection ring 29 to the first handlebar grip cuff 20. Also is depicted the loop 33 in reinforcing strap for second handlebar grip cuff which connects the second handlebar grip cuff connection ring 39 to the second handlebar grip cuff 30. Connection of the loop 23 in reinforcing strap for first handlebar grip cuff to the first handlebar grip cuff 20 is depicted by third connector 24 for first handlebar grip cuff and the fourth connector 25 for first handlebar grip cuff. Connection of the loop 33 in reinforcing strap for second handlebar grip cuff to the second handlebar grip cuff 30 is depicted by third connector 34 for second handlebar grip cuff and the fourth connector 35 for second handlebar grip cuff. The loop 23 in reinforcing strap for first handlebar grip cuff 23 connects the first handlebar grip cuff connection ring 29 to the first handlebar grip cuff 20 and the loop 33 in reinforcing strap for second handlebar grip cuff connects the second handlebar grip cuff connection ring 39 to the second handlebar grip cuff 30. The first and second handlebar grip cuff connection rings, 29 and 39 respectively, permit the connection of the first and second tie down straps, 80 and 90 respectively, to the invention 10. Reference numeral 60 in the figures refers to the interior in the first handlebar grip cuff 20 which slides over the first motorcycle handgrip 100, while reference numeral 70 in the figures refers to the interior in the second handlebar grip cuff 30 which slides over the second motorcycle handgrip 110 when the apparatus 10 is installed on a motorcycle 115 for use. The first and second tie down straps, 80 and 90 respectively, would normally be installed between fixed anchor points in the trailer in which the motorcycle 115 was being transported and the invention 10.

Figure 4:
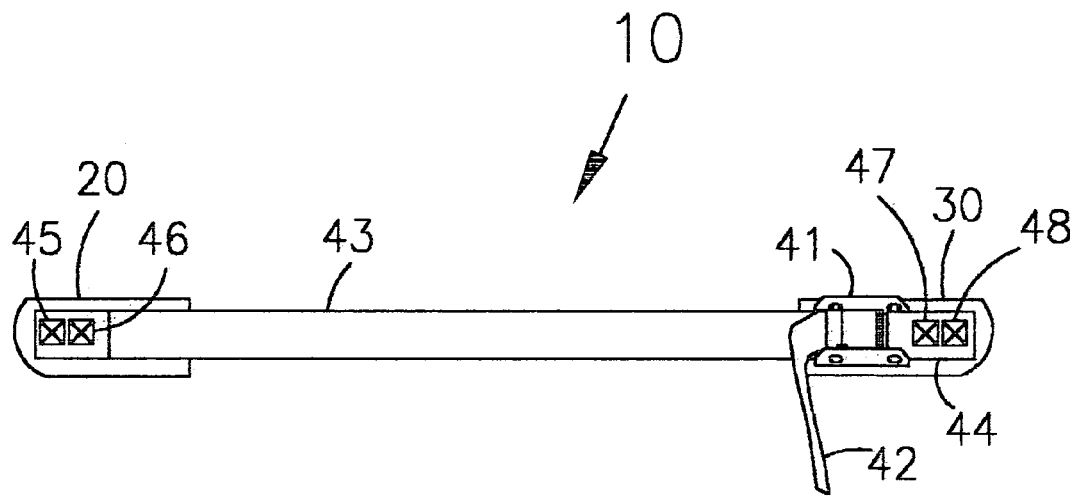
FIG. 4 is a top perspective view of the invention.
Figure 5:
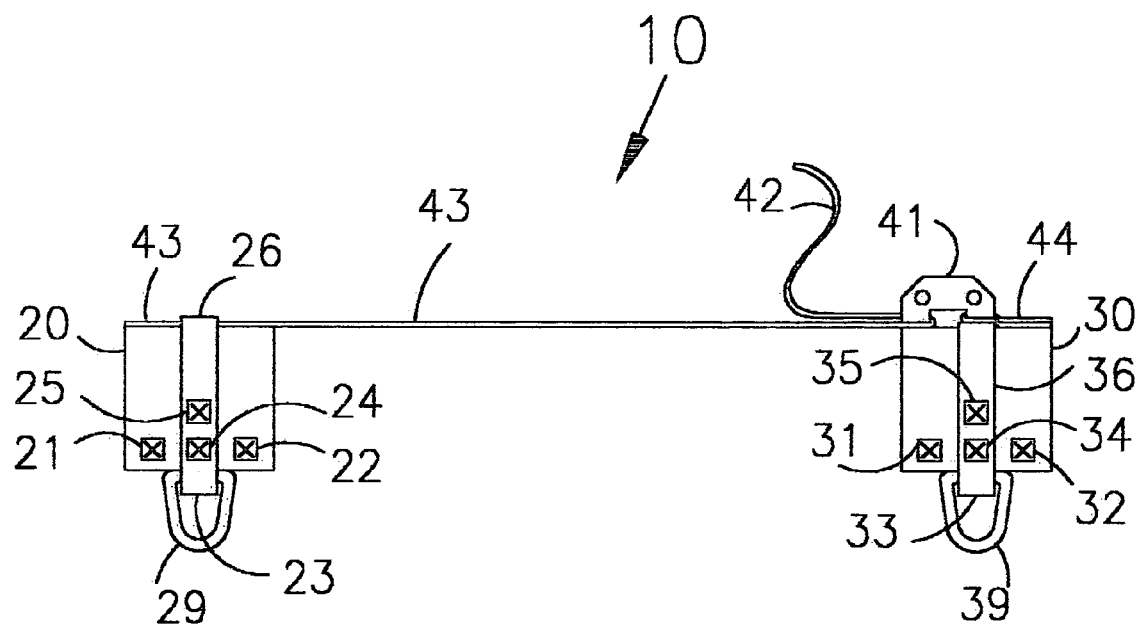
FIG. 5 is a vertical plane view of the invention.

FIG. 4 depicts a view from the top looking downward onto the invention 10. The detail of FIG. 4 depicts the connection of the handlebar grip cuff connection strap 43 to the first handlebar grip cuff 20 by the first connection strap connector 45 and the second connection strap connector 46, as well as the connection of the length adjustment mechanism connection strap 44 to second handlebar grip cuff 30 by the first length adjustment mechanism connection strap connector 47 and the second length adjustment mechanism connection strap connector 48. Also in FIG. 4, it is seen that in use the handlebar grip cuff connection strap 43 is fed through the length adjustment mechanism 41 and pulled tight producing a connection strap tail 42 portion of the handlebar grip cuff connection strap 43. FIG. 5 is a lateral plane view of the invention 10.

Figure 6:
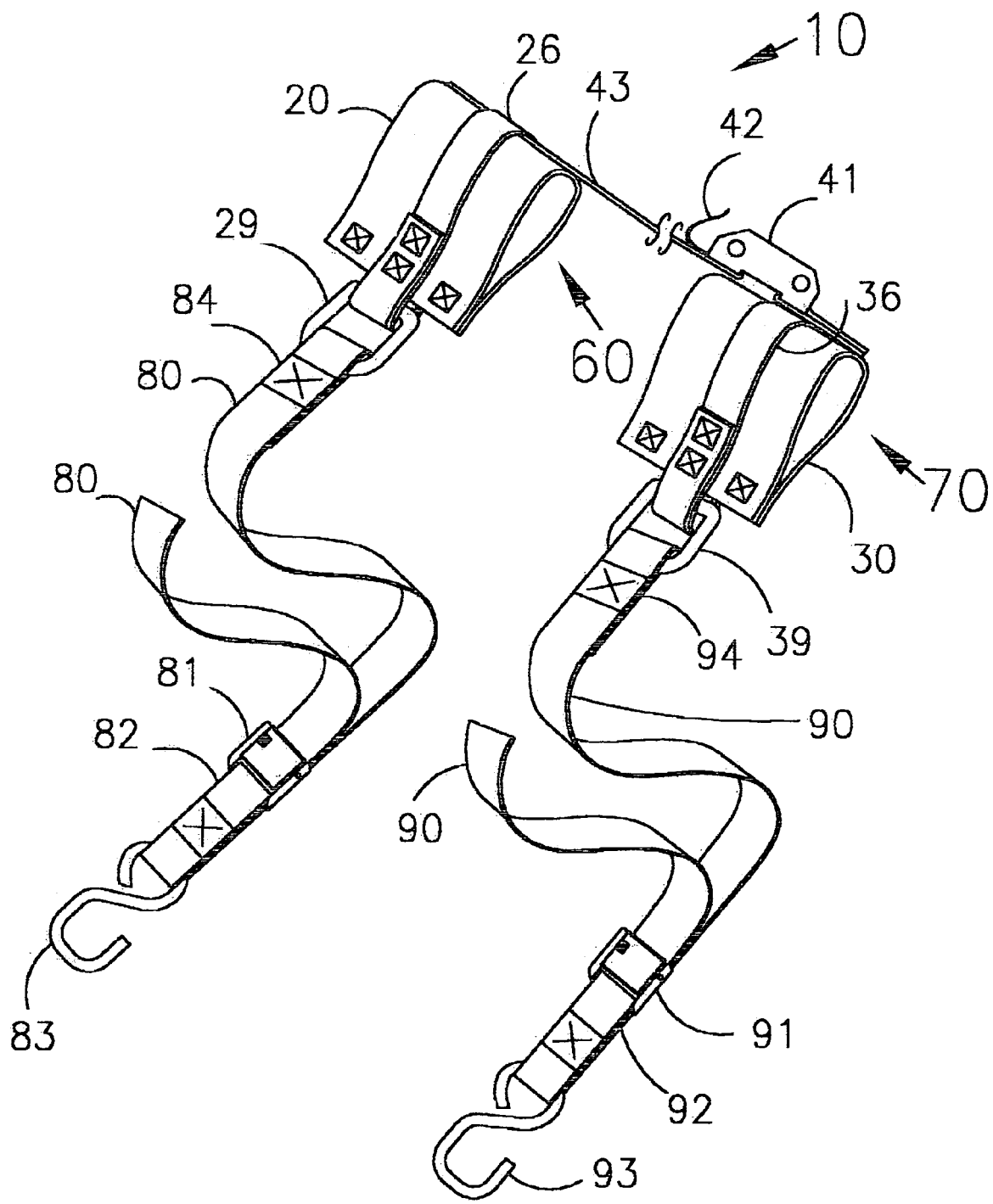
FIG. 6 is a perspective view of an alternate embodiment of the instant invention.

FIG. 6 depicts a second embodiment of the instant invention 10 wherein the first handlebar grip cuff connection ring 29 serves to connect the material of the reinforcing strap 26 for the first handlebar grip cuff to the material of the first tie down strap 80 directly and without intervening hooks. This is accomplished in the depicted embodiment by looping the material of the first tie down strap 80 over the first handlebar grip cuff connection ring 29 and then using the first tie down strap buckle connector 84 to connect the end of the first tie down strap 80 back to the body of the first tie down strap 80. Also FIG. 6 depicts the first tie down strap 80 as being adjustable in length by connection to the first tie down strap buckle 81 which is, in turn, connected to the securing hook 83 for first tie down strap buckle by the connector strap for first tie down strap buckle 82. Likewise, in FIG. 6, the second handlebar grip cuff connection ring 39 serves to connect the material of the reinforcing strap 36 for second handlebar grip cuff to the material of the second tie down strap 90 directly and without intervening hooks. This is accomplished in the depicted embodiment by looping the material of the second tie down strap 90 over the second handlebar grip cuff connection ring 39 and then using the second tie down strap buckle connector 94 to connect the end of the second tie down strap 90 back to the body of the second tie down strap 90. Also FIG. 6 depicts the second tie down strap 90 as being adjustable in length by connection to the second tie down strap buckle 91 which is, in turn, connected to the securing hook 93 for second tie down strap buckle by the connector strap for second tie down strap buckle 92.

Figure 7:
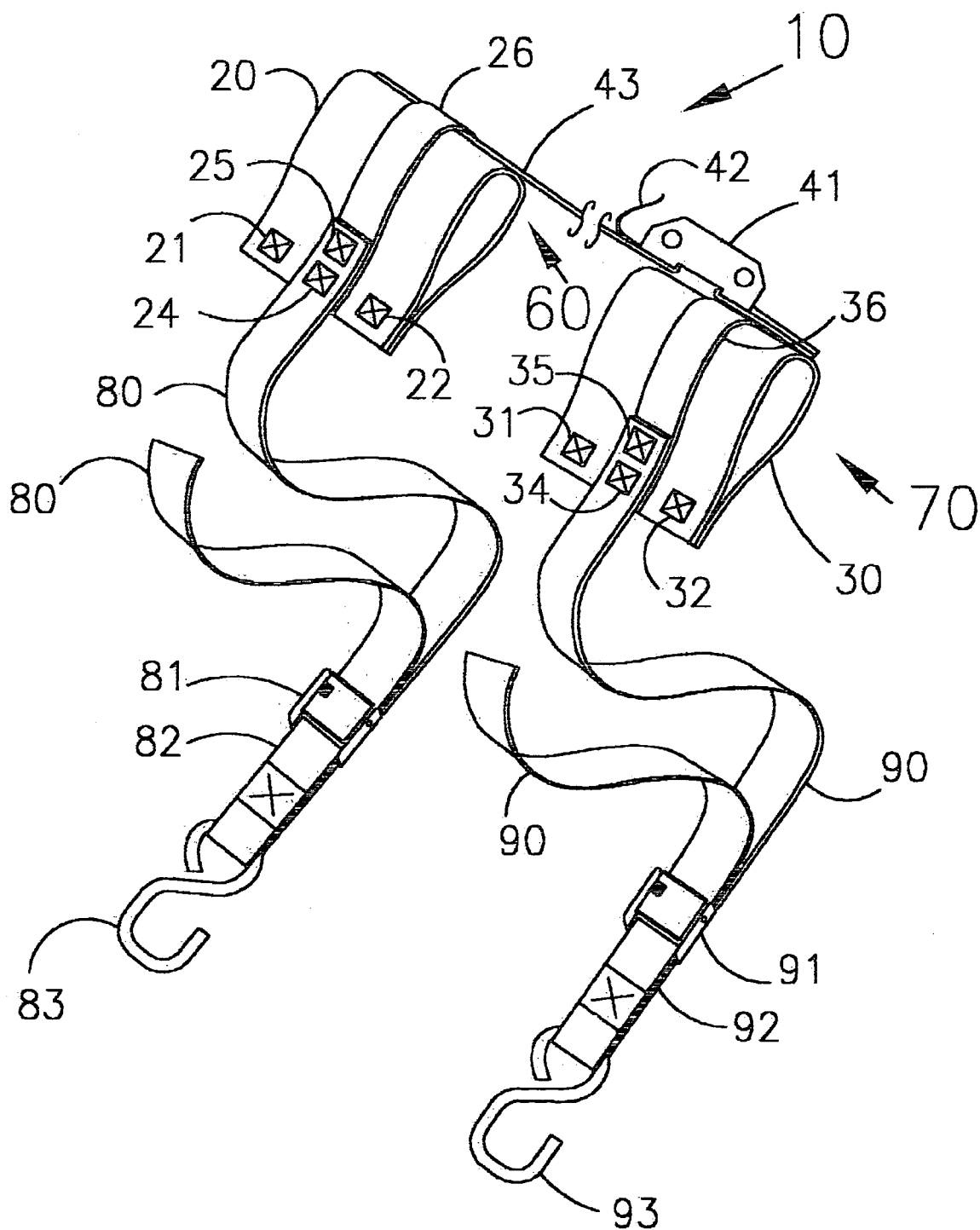
FIG. 7 is a perspective view of an alternate embodiment of the instant invention.

FIG. 7 depicts yet a third embodiment of the instant invention 10 wherein the first tie down strap 80 is connected directly to the reinforcing strap 26 for the first handlebar grip cuff by the third connector 24 for first handlebar grip cuff and the fourth connector 25 for first handlebar grip cuff without intervention of the first handlebar grip cuff connection ring 29; and the second tie down strap 90 is connected directly to the reinforcing strap 36 for second handlebar grip cuff by the third connector 34 for second handlebar grip cuff and the fourth connector 35 for second handlebar grip cuff without intervention of the second handlebar grip cuff connection ring 39.

Figure 8:
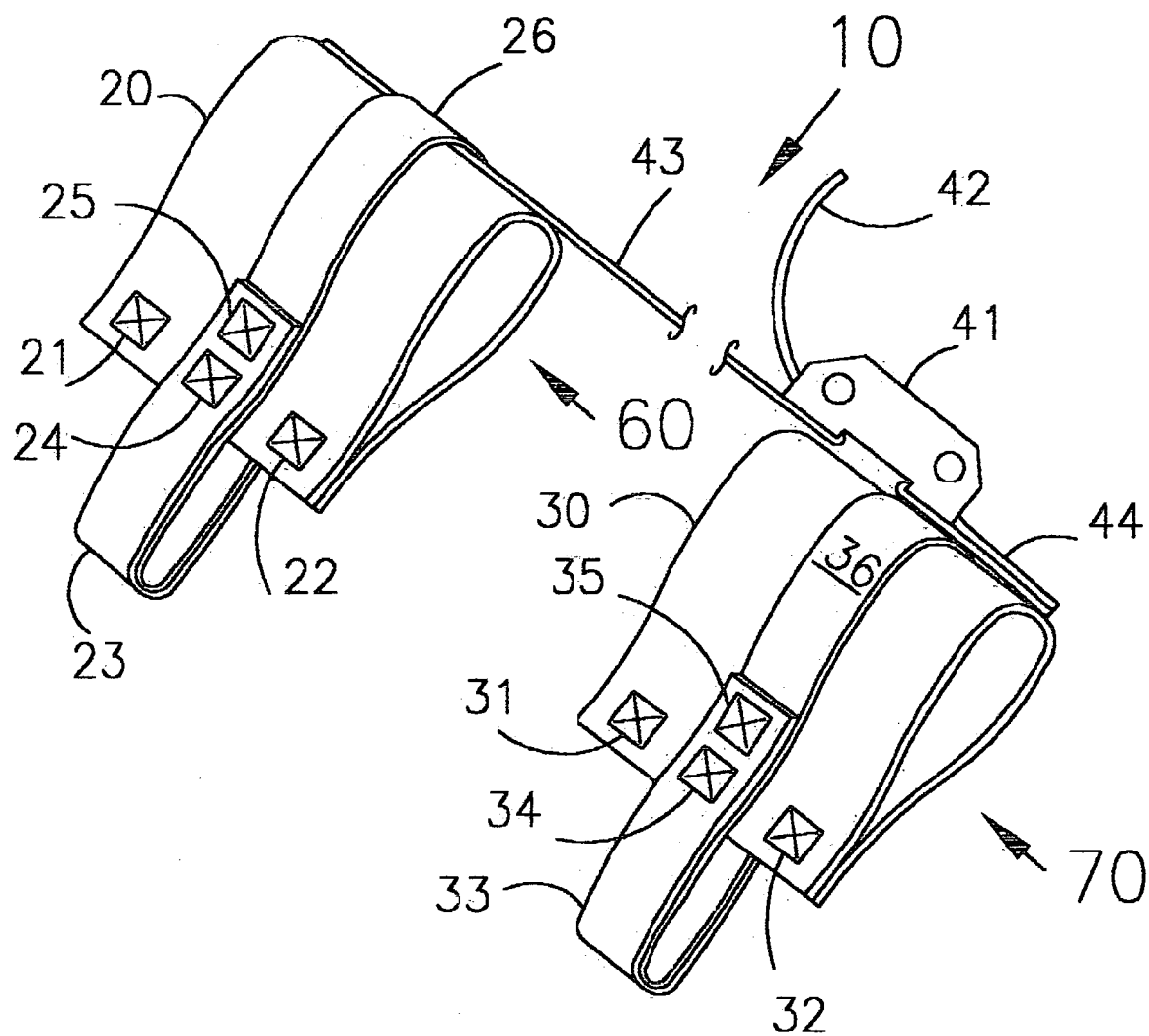
FIG. 8 is a lateral perspective view of an alternate embodiment of the invention.

FIG. 8 depicts a fourth embodiment of the invention 10 wherein the loop 23 in reinforcing strap for first handlebar grip cuff and the loop 33 in reinforcing strap for second handlebar grip cuff are elongated to receive hooks from standard cargo tie down straps which would take the place of the first tie down strap 80 and of the second tie down strap 90 in securing the invention 10, installed on a motorcycle 115, to a trailer or other transport platform.

Each of the foregoing described embodiments requires modification of the means whereby the tie down strap, 80 or 90, connects to the handlebar grip cuffs, 20 or 30. In the first embodiment the tie down strap connection means is by connection of the connecting hooks, 85 and 95, of the tie down straps, 80 and 90, to the handlebar grip cuff connection rings 29 and 39, respectively. In the second embodiment the tie down strap connection means is by connection of the tie down straps, 80 and 90, to the handlebar grip cuff connection rings 29 and 39, respectively. In the third embodiment the tie down strap connection means is by connection of the tie down straps, 80 and 90, to the handlebar grip cuffs, 20 and 30, respectively. In the fourth embodiment the tie down strap connection means is by connection of the connecting hooks, 85 and 95, of the tie down straps, 80 and 90, to loops, 23 and 33, in reinforced sections of the handlebar grip cuffs, 20 and 30, respectively. The connection of the first tie down strap 80 to the first handlebar grip cuff 20 is depicted in FIG. 1 as being by virtue of connection of the connecting hook 85 for first tie down strap to the first handlebar grip cuff connection ring 29, and the subsequent connection of the first handlebar grip cuff connection ring 29 to the loop 23 in reinforcing strap for first handlebar grip cuff which is, in turn, connected to the reinforcing strap 26 for first handlebar grip cuff by the third connector 24 for first handlebar grip cuff and the fourth connector 25 for first handlebar grip cuffs. The connection of the second tie down strap 90 to the second handlebar grip cuff 30 is depicted in FIG. 1 as being by virtue of connection of the connecting hook 95 for second tie down strap to the second handlebar grip cuff connection ring 39, and the subsequent connection of the second handlebar grip cuff connection ring 39 to the loop 33 in reinforcing strap for second handlebar grip cuff which is, in turn, connected to the reinforcing strap 36 for second handlebar grip cuff by the third connector 34 for second handlebar grip cuff and the fourth connector 35 for second handlebar grip cuff. It is anticipated that the connectors 21, 22, 24, 25, 31, 32, 34 and 35 will be by stitching the layers of material together, by riveting the layers of material together, or by adhering the layers of material together.

In practice, the invention 10 provides first and second handlebar grip cuffs, 20 and 30, which fit loosely over the first and second motorcycle handgrips, 100 and 110 respectively, but beneath the motorcycle clutch lever 123 and the motorcycle brake lever 124, as depicted in FIG. 2. This loose fit permits some shifting of the invention 10 as necessary to accommodate the posture of the motorcycle 115 while upright on a transporting platform. The connection of the first and second tie down straps, 80 and 90, between the securing fittings on the transport platform and the first and second handlebar grip cuffs, 20 and 30, is ideally such that the first and second tie down straps, 80 and 90, are parallel to the motorcycle's 115 fork asserting downward and lateral forces on the motorcycle's body 115, through its first and second motorcycle handgrips, 100 and 110 respectively, and thence through its upper triple clamp 120, that maintain the motorcycle 115 in an upright position on the transport platform. This upright position with the motorcycle body 115 pointed straight ahead is the safest transport posture for the motorcycle 115 and poses the least probability of incidental damage to the motorcycle 115 as it is bumped along the road during transport. The first motorcycle handlebar 121 and the second motorcycle handlebar 122 are depicted as being connected to the motorcycle 115 by the upper triple clamp 120.

ECONOMIC BENEFIT STATEMENT

Economically, the instant invention 10 secures from movement a motorcycle 115 in a vertical position in a trailer during transport without using materials or other features that would mar the paint or finish of the motorcycle 115 being transported or that would damage the handlebar grips or handlebar grip controls of the motorcycle 115. The instant invention 10 thereby avoids damage to the motorcycle 115 being transported which would have to be repaired, saving both the time and the monetary losses which would be occasioned by such damage repair. The instant invention 10 is lightweight and intuitive to both install and uninstall whereby labor usage is minimized when securing a motorcycle 115 in a trailer for transport. Additional economic benefits will become apparent from a review of the instant invention 10 as hereinafter defined in the claims.

CONCLUSION

While the preferred embodiments of the instant invention 10 have been described in substantial detail and fully and completely hereinabove, it will be apparent to one skilled in the art that numerous variations of the instant invention 10 may be made without departing from the spirit and scope of the instant invention 10, and accordingly the instant invention 10 is to be limited only by the following claims.

What is claimed is:

1. An apparatus for securing a two-wheeled vehicle in an upright position during transport comprising:
   a first handlebar grip cuff,
   a second handlebar grip cuff,
   a first handlebar grip cuff connection means,
   a second handlebar grip cuff connection means,
   a handlebar grip cuff connection strap,
   a length adjustment mechanism,
   a first tie down strap, and
   a second tie down strap;
   wherein
   said handlebar grip cuff connection strap provides a first end,
   said handlebar grip cuff connection strap provides a second end,
   said first handlebar grip cuff is connected to said first tie down strap by said first handlebar grip cuff connection means,
   said second handlebar grip cuff is connected to said second tie down strap by said second handlebar grip cuff connection means,
   said first end is connected to said first handlebar grip cuff,
   said second end is connected to said length adjustment mechanism,
   said length adjustment mechanism is connected to said second handlebar grip cuff,
   said first tie down strap provides a first tie down strap connection hook,
   said second tie down strap provides a second tie down strap connection hook,
   said first handlebar grip cuff provides a first reinforcing strap,
   said first reinforcing strap provides a first loop,
   said second handlebar grip cuff provides a second reinforcing strap,
   said second reinforcing strap provides a second loop,
   said first handlebar grip cuff connection means comprises the connection of said first loop to said first tie down strap connection hook, and
   said second handlebar grip cuff connection means comprises the connection of said second loop to said second tie down strap connection hook.

* * * * *